United States Patent [19]
Ma et al.

[11] Patent Number: 5,627,728
[45] Date of Patent: May 6, 1997

[54] EXPANSION BOX FOR NOTEBOOK COMPUTERS

[76] Inventors: Hsi-Kuang Ma, 4F, No. 48, Sec. 2, Chung Cherng Rd., Taipei; Yung-Fa Cheng, 3F, No. 8, Alley 2, Lane 30, Deng Gong Rd., Dan Shui, Taipei Hsien, both of Taiwan

[21] Appl. No.: 567,104

[22] Filed: Dec. 4, 1995

[30] Foreign Application Priority Data

Nov. 13, 1995 [CN] China .................. 95223985.X

[51] Int. Cl.⁶ .................................................. G06F 1/16
[52] U.S. Cl. ................................................... 361/686
[58] Field of Search ........................ 364/708.1, 708, 364/514; 361/391, 686; 345/168; 395/750

[56] References Cited

U.S. PATENT DOCUMENTS

| | | | |
|---|---|---|---|
| 4,893,263 | 1/1990 | Myers | 364/708 |
| 5,159,533 | 10/1992 | Kuang | 361/391 |
| 5,400,055 | 3/1995 | Ma et al. | 345/168 |
| 5,430,883 | 7/1995 | Horiuchi | 395/750 |
| 5,459,637 | 10/1995 | Ma et al. | 361/686 |
| 5,488,572 | 1/1996 | Belmont | 364/514 R |
| 5,504,649 | 4/1996 | Hosoya et al. | 361/686 |

*Primary Examiner*—Paul P. Gordon
*Assistant Examiner*—Monica Lewis
*Attorney, Agent, or Firm*—Bacon & Thomas

[57] ABSTRACT

An expansion box for use in notebook computers includes a box having a base and four side walls, two lateral side walls thereof being provided with projections for insertion into corresponding slots at the bottom side of a notebook computer; an expansion board fastened to the box and having an expansion connector at an upper side thereof and, more than one unit connector connected to the expansion connector via wires at a lower side thereof and a plurality of expansion units in the form of cartridges or cards each having a connector for mating with a corresponding unit connector of the expansion board. The expansion board is fastened to the box and the expansion units are connected to the expansion board, while the box is coupled to the bottom side of the notebook computer and the expansion connector of the expansion board is connected to a connector at a rear side of the notebook computer.

4 Claims, 3 Drawing Sheets

EXPANSION BOX FOR NOTEBOOK COMPUTERS

BACKGROUND OF THE INVENTION

1. Field of the Invention

The present invention relates generally to an expansion device for computers, and more particularly to an expansion box for notebook computers which may be easily and conveniently mounted thereto.

2. Description of the Prior Art

Nowadays, portable notebook computers are in the main stream of the computer industry. Their compactness has made them very popular among consumers; however, they provide limited functions due to their small size. Hence, there are available on the market peripheral expansion devices for notebook computers. Notebook computers are directly connected to desk-top computers or expansion cartridges when in use in order to expand their functions, which means greater working space is required.

SUMMARY OF THE INVENTION

Accordingly, a primary object of the present invention is to provide an expansion box for notebook computers which may be mounted to a bottom side of a notebook computer so that it will not occupy space.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
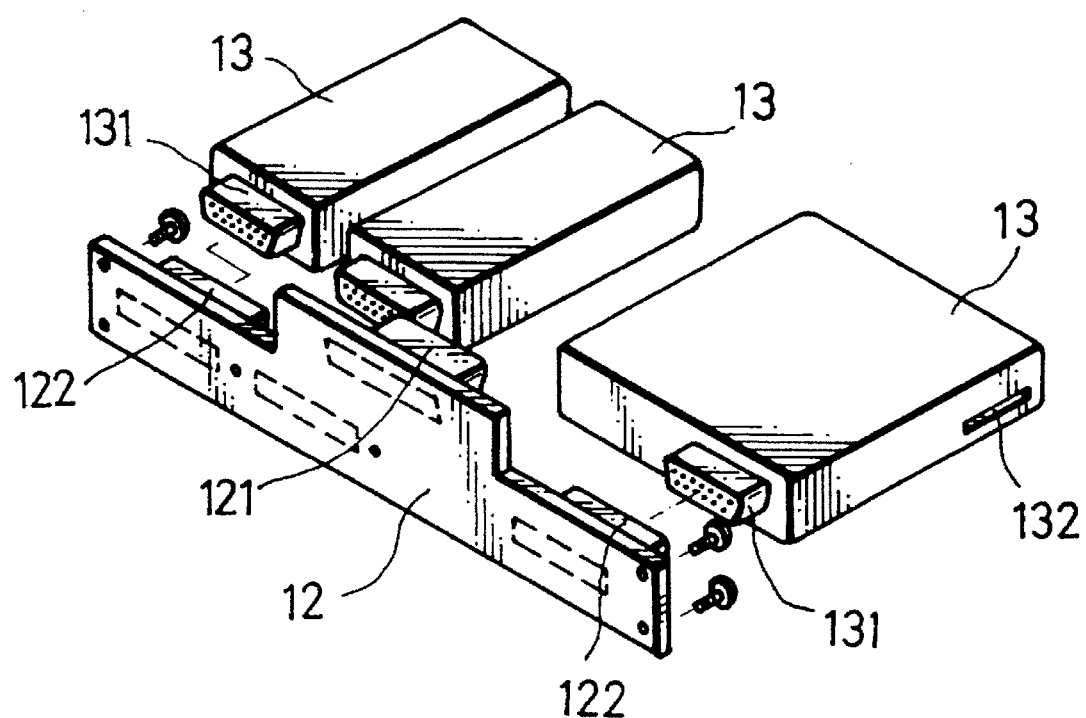
FIG. 1 is a perspective exploded view of an expansion board and an expansion unit of the invention.
Figure 2:
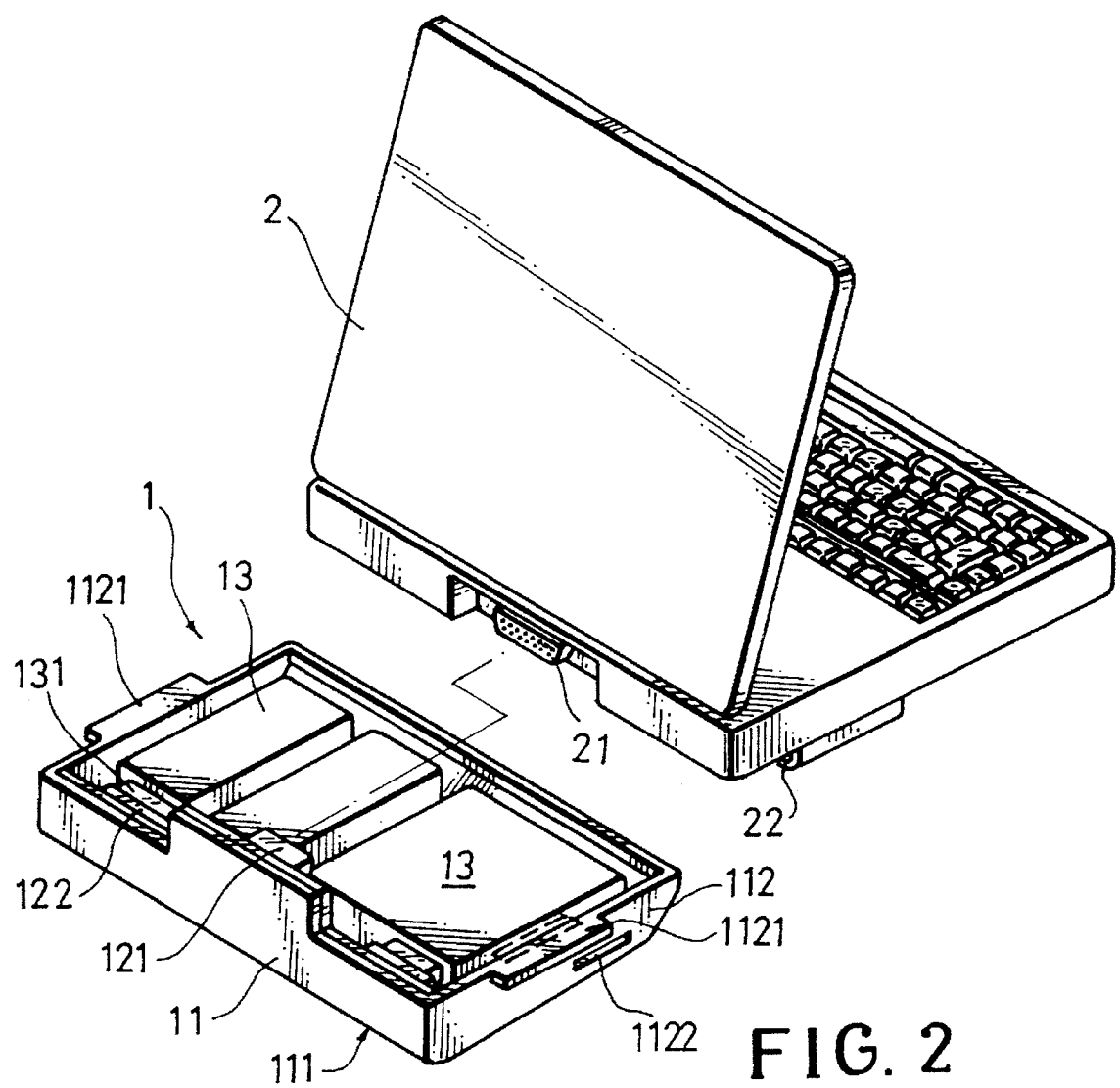
FIG. 2 is a perspective exploded view of an expansion box and a notebook computer of the invention.

With reference to the drawings, the expansion box according to the present invention basically comprises an expansion box 1 and a notebook computer 2.

The expansion box 1 consists of a box 11, an expansion board 12 and a plurality of expansion units 13 accommodated in the box 11.

The box 11 includes a base 111 and surrounding walls 112. Both lateral side walls of the box 11 are respectively provided with male members 1121 for insertion into corresponding females members 22 at a bottom side of the notebook computer 2. In order that the notebook computer 2 may slant suitably downwardly after the box 11 is mounted to the notebook computer 2, the surrounding walls 112 are configured to gradually decrease in height from a point adjacent the expansion board 12 after the expansion board is fastened to a longitudinal side wall of the box 11.

The expansion board 12 is a plate-like structure with an expansion connector 121 disposed at an upper portion thereof for connecting with the notebook computer 2 and more than 1 unit connector 122 at a lower portion thereof, the unit connector 122 being connected to the expansion connector 121 via wires. A plurality of screw holes are respectively formed in either side thereof for passage of screws to fasten the expansion board 12 to the side wall of the box 11.

The expansion units 13 may be expansion cartridges or cards according to intended purposes. The expansion units 13 are respectively provided with a connector 131 for mating with the unit connector 122 to provide electrical connections between the expansion connector 121 and the expansion units 13 and may also be provided with externally connected connectors around their peripheries.

The notebook computer 2 is a conventional one essentially including a motherboard and a keyboard. A connector 21 is provided at a depression formed at a rear side of the notebook computer 2 and is connected to the motherboard inside. Besides, females members 22 are individually disposed on both sides of the bottom side of the notebook computer 2 for matching the male members 1121 of the box 11.

Figure 3:
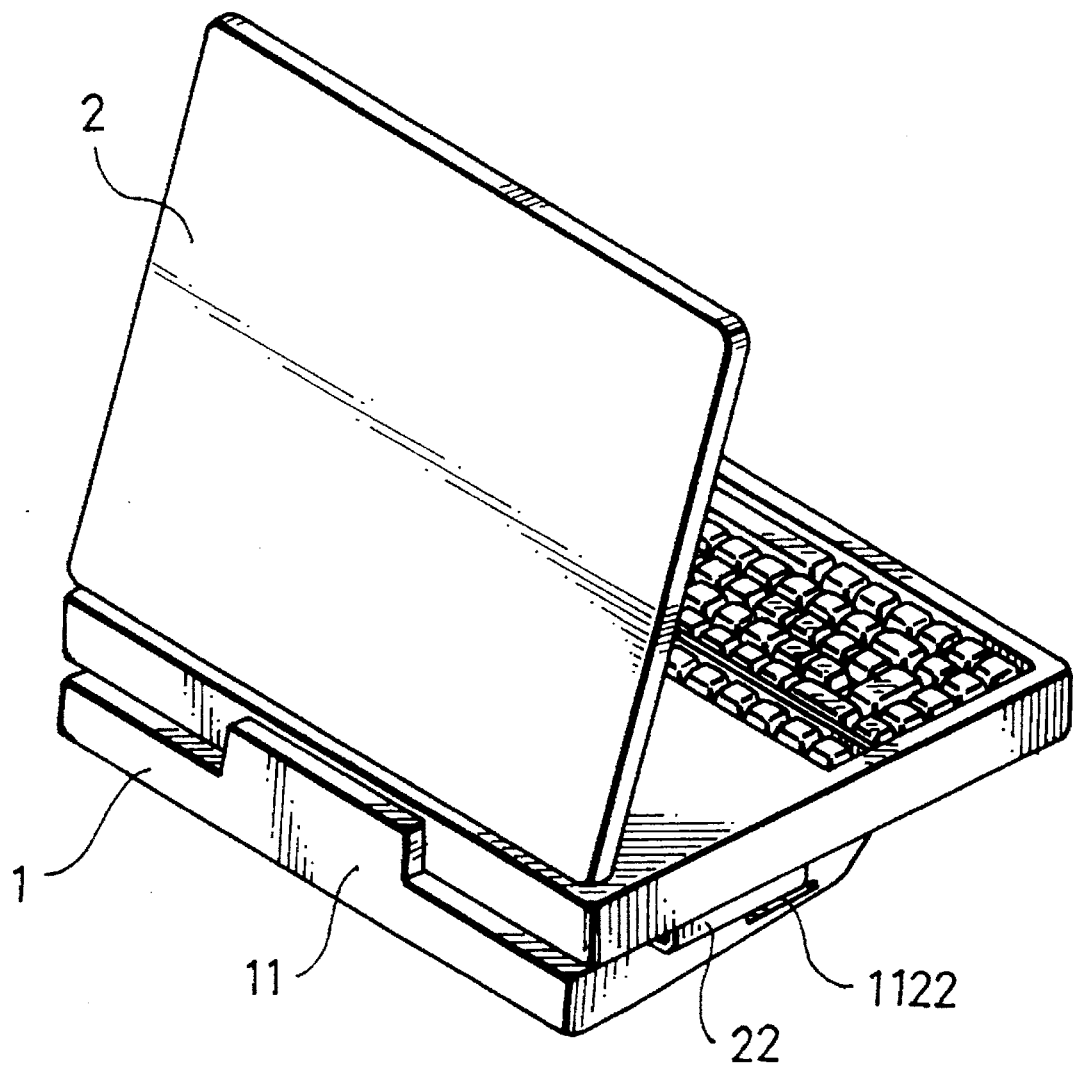
FIG. 3 is a schematic perspective view of the invention after assembly.

With further reference to the drawings, in assembly, the expansion board 12 is firstly locked to the box 11, and the expansion units 13 are then connected to the expansion board 12 by means of their connectors 131 engaging the corresponding unit connectors 122 of the expansion board 12. The male members 1121 of the box 11 are then inserted into the corresponding female members 22 of the notebook computer 2 such that the expansion connector 121 of the expansion board 12 engages the connector 21 of the notebook computer 2. As shown in FIG. 3, after assembly, the side of the notebook computer 2 with the display is at a higher position so that the keyboard is slightly slanting. Such an ergonomic design permits comfortable manipulation of the keyboard.

In addition, slots 1122 may be formed in the surrounding walls 112 of the box 11 to permit external connection or to facilitate mounting or replacement of cartridge type expansion units 13 which are correspondingly provided with expansion slots 132. Likewise, slots may also be formed in the expansion board 12.

Besides, as the expansion box 1 is an independent unit, it may be provided with a cover when adapted for constant use. Furthermore, the box 11 may be connected to the notebook computer 2 in various ways, other than that described herein.

Therefore, in actual use, the expansion box may be selectively mounted to or separated from the notebook computer as dictated by circumstances.

Although the present invention has been illustrated and described with reference to the preferred embodiment thereof, it should be understood that it is in no way limited to the details of such embodiment but is capable of numerous modifications within the scope of the appended claims.

What is claimed is:

1. An expansion box for use with notebook computers, comprising:

a box consisting of four side walls and a base, two lateral sides thereof being provided with male members for connection to female members of a notebook computer; a single expansion board secured within said box and having an expansion connector mounted to an upper side thereof and a plurality of unit connectors mounted to a lower side thereof, said upper side of the expansion board being on an opposite side of said board from said base and said lower side of the expansion board being adjacent said base, with said unit connectors being connected to said expansion connector by wires and both said expansion connector and said unit connectors facing in a same direction; said expansion board further having securing means disposed at both sides thereof for securing said expansion board in said box;

a plurality of expansion units in the form of cartridges or cards situated in said box, said expansion units each having a connector for mating with a corresponding one of said unit connectors on the lower side of said expansion board;

wherein when said expansion box is coupled to the bottom side of the notebook computer by means of said male members fitting into said female members of the notebook computer, and said expansion connector mounted on the upper side of said expansion board is connected to a connector located at a rear side of the notebook computer, said expansion units are positioned below said notebook computer and connected thereto by means of the single expansion board.

2. An expansion box as claimed in claim 1, wherein said expansion units and said expansion board are provided with slots, and said box includes corresponding slots for mounting or replacement of expansion units or for external connection.

3. An expansion box as claimed in claim 1, wherein said box is provided with a cover for sealing said box.

4. An expansion box as claimed in claim 1, wherein said said male members are in the form of projections for insertion into slots formed in said female members at the bottom side of the notebook computer.

* * * * *